(12) United States Patent
Wickstrom et al.

(10) Patent No.: US 6,933,035 B1
(45) Date of Patent: Aug. 23, 2005

(54) THERMAL HEAT SHIELD

(76) Inventors: Frank C. Wickstrom, 639 Kennard Atlantic Rd., Greenville, PA (US) 16125-9448; Penny J. Wickstrom, 639 Kennard Atlantic Rd., Greenville, PA (US) 16125-9448

( * ) Notice: Subject to any disclaimer, the term of this patent is extended or adjusted under 35 U.S.C. 154(b) by 0 days.

(21) Appl. No.: 10/681,706

(22) Filed: Oct. 9, 2003

(51) Int. Cl.7 .................................................. B32B 3/10
(52) U.S. Cl. ........................ 428/122; 428/134; 428/138; 422/301; 297/DIG. 5; 442/301
(58) Field of Search ................................ 428/122, 134, 428/138; 297/DIG. 5; 442/301, 394

(56) References Cited

U.S. PATENT DOCUMENTS

| | | |
|---|---|---|
| 2,758,532 A | 8/1956 | Awe |
| 3,326,601 A | 6/1967 | Vanderbilt et al. |
| 4,002,108 A | 1/1977 | Drori |
| 4,634,176 A | 1/1987 | Scott |
| 4,923,248 A | 5/1990 | Feher |
| 5,385,790 A | 1/1995 | Atkinson et al. |
| 5,981,082 A | 11/1999 | Pirchl |
| 6,279,229 B1 | 8/2001 | Lemke et al. |

*Primary Examiner*—Alexander S. Thomas
(74) *Attorney, Agent, or Firm*—Donald R. Schoonover

(57) ABSTRACT

A thermal heat shield is formed of a plurality of layers that are sandwiched together and which is adapted for a plurality of uses, including use on an automobile seat to shield a driver from heat generated behind the driver or beneath the automobile.

4 Claims, 1 Drawing Sheet

THERMAL HEAT SHIELD

BACKGROUND OF THE INVENTION

1. Field of the Invention

The present invention relates to the general art of stock materials, and to the particular field of multi-layer materials that can be used as heat shields.

2. Discussion of Related Information

NASCAR drivers are subjected to many sources of heat during a race. These heat sources include the engine, the oil tank system that is located behind the driver as well as the road via the floor boards of the car. Since NASCAR vehicles are operated at extremely high levels of performance, these heat sources can be quite significant. Still further, since most NASCAR races require several hours to complete, the driver may be subjected to such high heat sources for prolonged periods of time. Not only can this be uncomfortable, it can be dangerous. The driver may actually be burned by the heat generated by the oil tank system located behind the driver. Also, a prolonged exposure to such high levels of heat may distract the driver, which can be dangerous, especially at the extremely high speeds and extremely close quarters associated with NASCAR racing.

Therefore, there is a need for a means to protect a driver from heat generated by an automobile during operation of that automobile, especially if the automobile is being operated at extremely high levels of performance for extended periods of time.

Since space is at a premium in most race cars, and any surfaces may be oddly shaped to accommodate the requirements of race cars, any means used to protect the driver from heat generated during operation of the vehicle must be very versatile and be amenable to a high degree of adaptation so the means can be placed in the exact location where it will be most effective.

Therefore, there is a need for a means to protect a driver from heat generated by an automobile during operation of that automobile, especially if the automobile is being operated at extremely high levels of performance for extended periods of time yet which is highly adaptable and versatile.

PRINCIPAL OBJECTS OF THE INVENTION

It is a main object of the present invention to provide a heat shield that is versatile.

It is another object of the present invention to provide a heat shield that can be used in an automobile.

It is another object of the present invention to provide a heat shield that can be placed on the driver's seat of an automobile and will shield the driver from heat generated behind the driver.

It is another object of the present invention to provide a heat shield that can be used in a race car to protect the driver from heat generated behind or beneath the driver.

SUMMARY OF THE INVENTION

These, and other, objects are achieved by a multilayer heat shield that includes a glass thermal barrier cloth sheet sandwiched between two sheets of heat resistant ABS plastic each of which has a lattice frame defining a multiplicity of rectangular openings that are arranged in a honeycomb format with respect to each other. The sheets are mounted on a substrate, such as an automobile seat, by a U-shaped frame and heat resistant adhesive.

The heat shield embodying the present invention is adaptable to a wide variety of uses and can be easily mounted on the rear surface of an automobile seat or on the floor of the automobile. This is especially useful in a race car which may have elements, such as oil tank systems or the like, that generate a great deal of heat and which may make the driver very uncomfortable. However, many other uses for the heat shield can be envisioned by one skilled in the art based on the teaching of this disclosure.

BRIEF DESCRIPTION OF THE DRAWING FIGURES

DETAILED DESCRIPTION OF THE PREFERRED EMBODIMENT

Other objects, features and advantages of the invention will become apparent from a consideration of the following detailed description and the accompanying drawings.

Referring to the figures, it can be understood that the present invention is embodied in a heat shield 10. The heat shield 10 can be used in a wide variety of situations, but will be described in conjunction with use on an automobile seat to protect a driver from heat generated behind the driver. However, it will be understood by those skilled in the art that the heat shield embodying the present invention can also be used in conjunction with oven mitts, kneeling pads for ironworkers, shields for torch cutting and welding, aprons for foundry workers, covers for firefighter boots, fire truck tire covers, or covers for vehicles that are used near fires, shoes, and the like. Heat shield 10 comprises a U-shaped frame 12 that is adapted to be mounted on the rear surface of an automobile seat AS, indicated in FIG. 1 by a dashed line. Frame 12 is formed of ABS plastic or other suitable material and has a width of approximately three-fourths inches. Frame 12 includes heat resistant adhesive 14 which is used to mount the frame 12 on the automobile seat.

Figure 1:
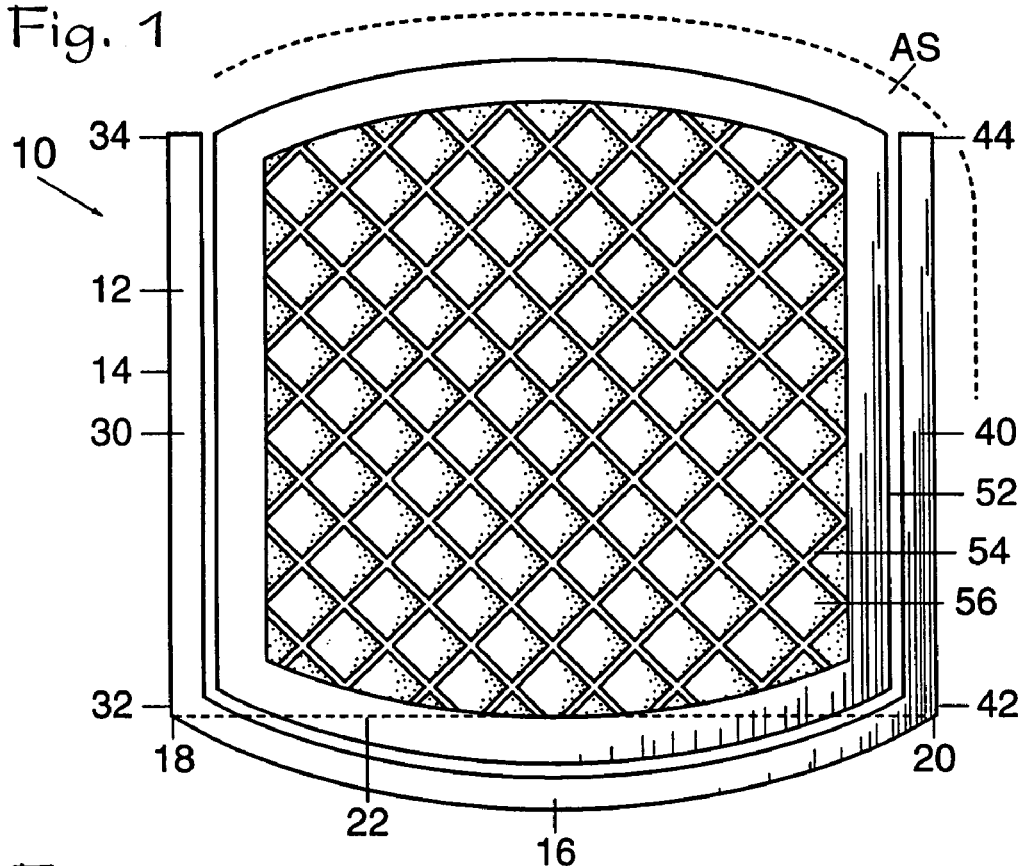
FIG. 1 is a view showing the heat shield embodying the present invention.
Figure 2:
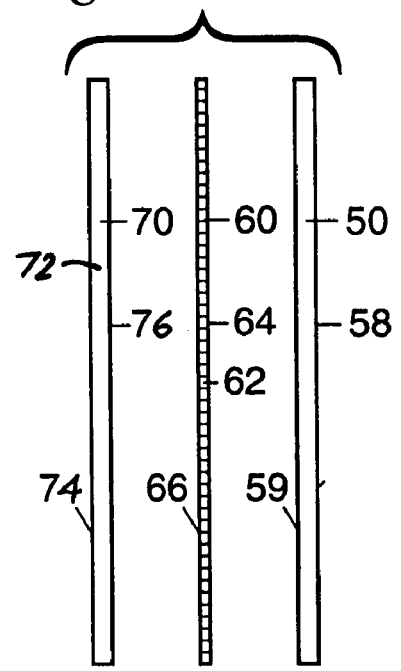
FIG. 2 is a side view of the heat shield embodying the present invention with the plurality of sheets separated.

Frame 12 further includes a bight section 16 having a first end 18, a second end 20, and a longitudinal axis 22 which extends between the first end 18 and the second end 20. The bight section 16 is shown in FIG. 1 as being arcuate, but could be linear if desired.

A first leg section 30 is unitary with the first end 18 of the bight section 16. The first leg section 30 includes a proximal end 32 that is unitary with the first end 18 of the bight section 16 and a distal end 34 that is spaced apart from the bight section 16. A second leg section 40 is unitary with the second end 20 of the bight section 16 and is spaced apart from the first leg section 30 along the longitudinal axis 22 of the bight section 16. The second leg section 40 includes a proximal end 42 that is unitary with the second end 20 of the bight section 16 and a distal end 44 that is spaced apart from the bight section 16.

A first sheet 50 is supported in the U-shaped frame 12 and includes an edge 52 that is located adjacent to the U-shaped frame 12 to be supported thereon and a lattice 54 that defines a multiplicity of rectangular openings, such as opening 56, defined in honeycomb relationship with each other. The rectangular openings are generally square in form as shown in FIG. 1. The first sheet 50 further includes a first face 58 and a second face 59. The first face 58 is oriented towards the automobile seat.

A second sheet 60 is supported in the U-shaped frame 12 and includes an edge 62 that is co-incident with the edge 52 of the first sheet 50. The second sheet 60 is formed of glass thermal barrier cloth and has a first face 64 that is congruent with the second face 59 of the first sheet 50 and a second face 66 that is oriented away from the automobile seat.

A third sheet 70 is supported in the U-shaped frame 12 and includes an edge 72 that is located adjacent to the U-shaped frame 12 and a lattice which is identical to the lattice 54 of the first sheet 50 and which defines a multiplicity of rectangular openings defined in honeycomb relationship with each other. Each of the openings of the third sheet 70 is congruent with an opening in the first sheet 50. The third sheet 70 further includes a first face 74 and a second face 76. The second face 76 of the third sheet 70 is congruent with the second face 66 of the second sheet 60 and the first face 74 of the third sheet 70 is oriented towards away from the automobile seat.

The sheets are shown spaced apart from the U-shaped frame 12 in FIG. 1, but those skilled in the art will understand that the sheets 50, 60, 70 are all in contact with the frame 12 and supported thereby in use. The second sheet 60 is sandwiched between the first sheet 50 and third sheet 70 and all three sheets 50, 60, 70 are congruent with each other as can be understood from FIG. 1. In the form shown, the lattice framework is approximately one-fourth inch thick, the openings are spaced apart on approximately two-inch centers, and the edge is approximately one and one-half inches wide.

Figure 3:
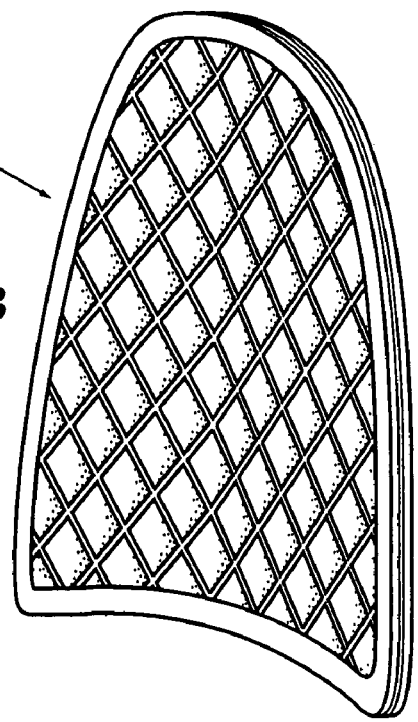
FIG. 3 shows one form of the heat shield that has been shaped in the form of a seat back.

As discussed above, the heat shield 10 of the present invention can be used in a variety of different situations. As indicated in FIG. 3, the heat shield 10 can be shaped to conform to a user's back for use on the back of a seat or as a back rest. The thus-shaped heat shield is indicated as heat shield 10' in FIG. 3.

It is to be understood that while certain forms of the present invention have been illustrated and described herein, it is not to be limited to the specific forms or arrangements of parts described and shown.

What is claimed and desired to be covered by Letters Patent is as follows:

1. A heat shield comprising:
   a) a U-shaped frame adapted to be mounted on the rear surface of an automobile seat, said frame being formed of ABS plastic and includes
      (1) heat resistant adhesive which mounts said frame on the automobile seat,
      (2) a bight section having a first end, a second end, and a longitudinal axis extending between the first end and the second end,
      (3) a first leg section which is unitary with the first end of the bight section, the first leg section including a proximal end that is unitary with the first end of the bight section and a distal end that is spaced apart from the bight section, and
      (4) a second leg section which is unitary with the second end of the bight section and spaced apart from the first leg section along the longitudinal axis of the bight section, the second leg section including a proximal end that is unitary with the second end of the bight section and a distal end that is spaced apart from the bight section;
   b) a first sheet supported in said U-shaped frame and which includes an edge that is located adjacent to said U-shaped frame and a lattice that defines a multiplicity of rectangular openings defined in honeycomb relationship with each other, said first sheet further including a first face and a second face, with the first face oriented towards the automobile seat;
   c) a second sheet supported in said U-shaped frame and which includes an edge that is co-incident with the edge of said first sheet, said second sheet being formed of glass thermal barrier cloth and having a first face that is congruent with the second face of said first sheet and a second face oriented away from the automobile seat;
   d) a third sheet supported in said U-shaped frame and which includes an edge that is located adjacent to said U-shaped frame and a lattice that defines a multiplicity of rectangular openings defined in honeycomb relationship with each other, said third sheet further including a first face and a second face, with the second face of said third sheet being congruent with the second face of said second sheet and the second first face of said third sheet being oriented away from the automobile seat; and
   e) said second sheet being sandwiched between said first and third sheets, and said first, second and third sheets being congruent with each other with the openings in said first and third sheets being congruent with each other.

2. The heat shield as described in claim 1 wherein the lattice of said first and third sheets is approximately one-fourth inch thick and adjacent openings of both said first sheet and said third sheet are spaced apart on approximately two-inch centers.

3. The heat shield as described in claim 2 wherein the rectangular openings defined in said first and third sheets are square.

4. The heat shield as described in claim 3 wherein the edges of said first and third sheets are approximately one and one-half inches wide.

* * * * *